May 4, 1954

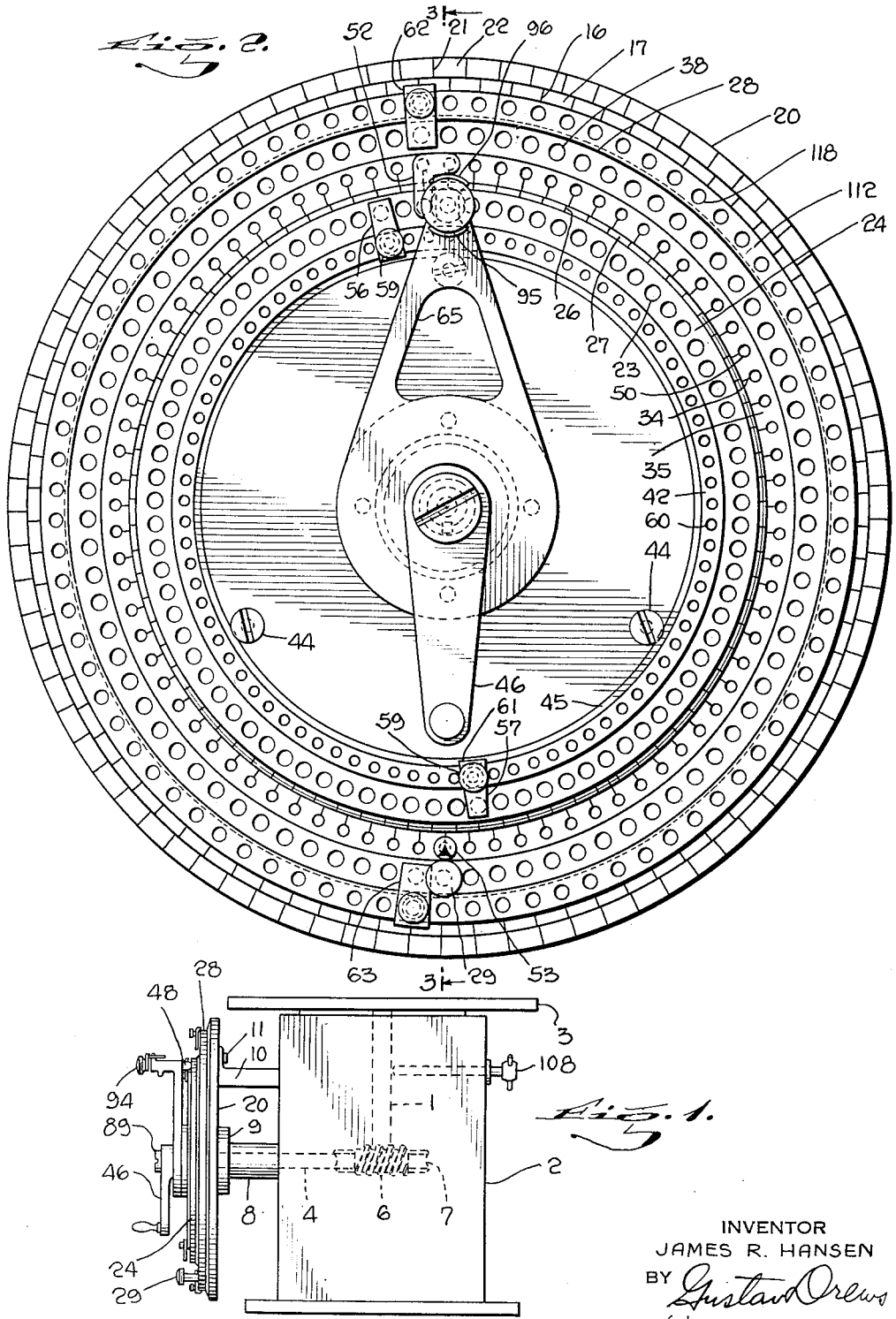

J. R. HANSEN 2,677,315

DIVIDING HEAD

Filed April 29, 1952

INVENTOR
JAMES R. HANSEN
BY Gustav Drews
his ATTORNEY

Patented May 4, 1954

2,677,315

UNITED STATES PATENT OFFICE 2,677,315

DIVIDING HEAD

James R. Hansen, Seattle, Wash., assignor of one-half to Gustav Drews, Garden City, N. Y.

Application April 29, 1952, Serial No. 284,909

8 Claims. (Cl. 90—57)

This invention relates in general to dividing heads for machine-shop tools, such as milling machines, spiral milling machines, drill presses and the like.

Among the objects of the present invention it is aimed to provide an improved dividing head for machine shop tools, such as milling machines, spiral milling machines, drill presses and the like, requiring no differential gears, compound gears or the like, such as disclosed in my Patents No. 2,357,329 issued September 5, 1944, and No. 2,567,936 issued September 18, 1951.

It is still another object of the present invention to provide an improved dividing head, characterized by the fact that for spacing even index holes and fractions of holes, the plunger pin simultaneously contacts the measured index circles of two disks, one of which is back of the other.

It is further characterized by a second similar but smaller fractional movement in reverse, which combined with the above fractional movement forward, produces a net measured sector of a further subdivided fractional order of fineness.

It is still another object of this invention to resolve the above forward and reverse fractional movements and for this purpose there is provided another disk—a freely turning resolving disk, which by virtue of its two index circles, is the common mate of each of the other two single circled disks.

According to well known practice a circle of holes on any of the disks may be used with a standard machine shop tool, such as a milling machine, drill press, or the like to control the cutting operations.

It is the object of this invention with reference to the aforementioned circles of holes to so proportion them that each pair—front disk to common disk and common disk to back disk—shall differ from each other in number preferably by one hole. This difference makes it possible to fractionally subdivide the index holes and is one of the main features of this invention. It is further an object that the number of holes chosen for these circles shall conveniently express division in degrees, minutes, seconds and fractions of seconds. The total number of divisions possible is ten million six hundred twenty seven thousand two hundred (10,627,200).

These and other features, capabilities and advantages of the present invention will appear from the subjoined detailed description of one specific embodiment thereof illustrated in the accompanying drawings, in which:

Fig. 1 is an end elevation of the dividing head operatively associated with a work table.

Fig. 2 is a front elevation of the dividing head showing the control disks drawn to a larger scale than that shown in Fig. 1.

Figure 3:
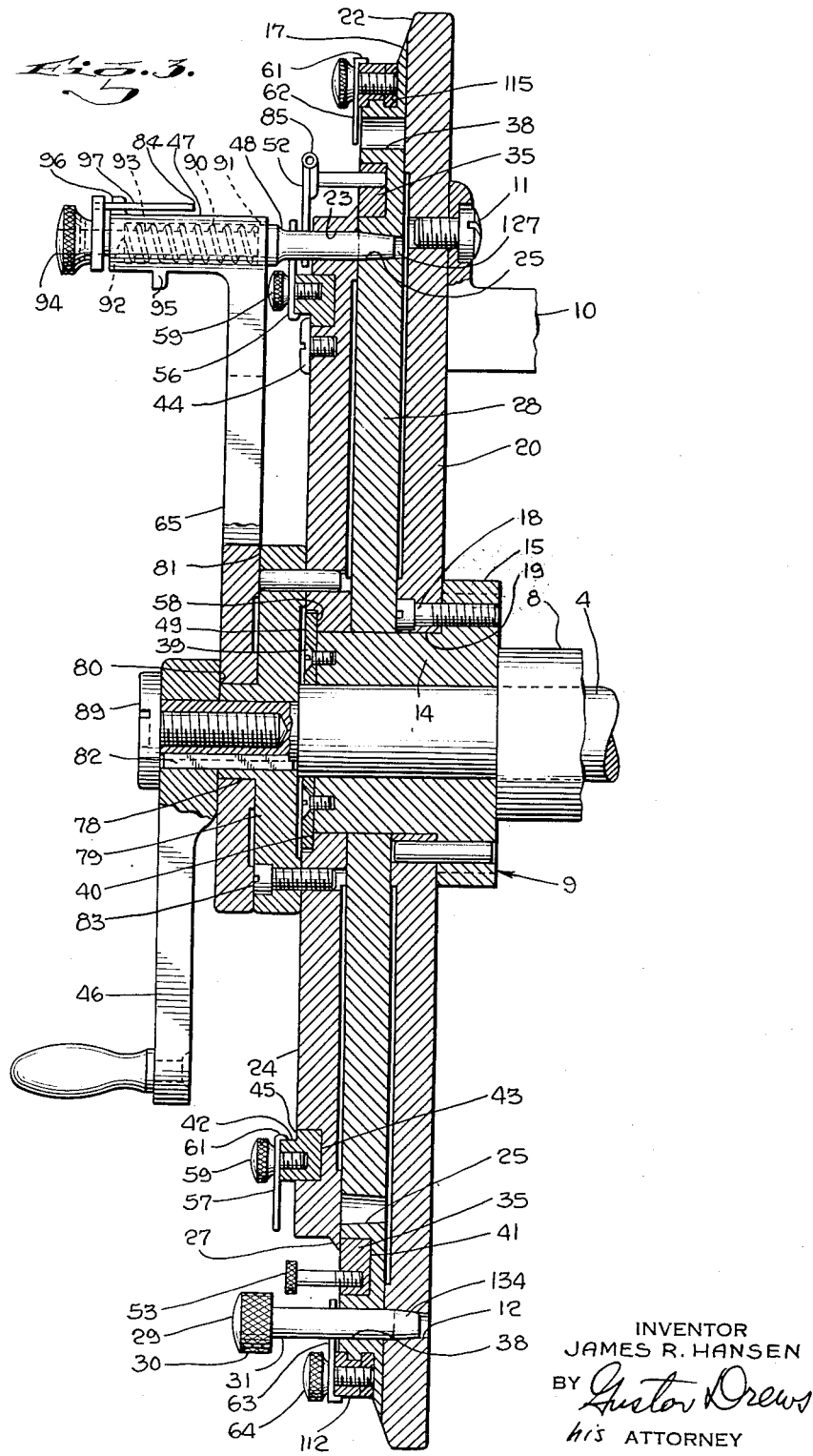
Fig. 3 is a side elevation partly in section on the line 3—3 of Fig. 2 of the dividing head drawn to a scale larger than that shown in Fig. 2.

In the embodiment shown, the shaft 1 is illustrated as journalled in a housing 2 with a work support, here shown as a work receiving table 3 secured to the upper end thereof. It is, of course, obvious that the shaft 1 is merely illustrative of the main shaft of a machine shop tool, whether rotatable about a vertical axis, a horizontal axis, or an inclined axis of any machine shop tool, such as a milling machine, drill press, turn table, or the like.

The shaft 1 is operatively associated with the control shaft 4 of the dividing head 5. The operative connection between the shaft 1 and shaft 4 in the present instance is shown as including a worm 6 on the shaft 4 in mesh with a worm wheel 7 on the shaft 1. While not limited to a reduction of 40 to 1, since the rotation of the driving shaft 1 generally is 1 to 40 rotations of the driving shaft 4 in the standard machine shop tool, it will be assumed that the reduction here too is illustrative of the standard 40 to 1 ratio.

The shaft 4 in the present instance, is journalled in the bearing 8 extending from the housing 2 and the shaft 4 extends through and beyond the bearing 8 to receive the gear sleeve 9 in which the shaft 4 is freely rotatable. The gear sleeve 9 is typical of the floating sleeve provided in nearly all heads for spiral milling. When a spiral milling operation is performed, the sleeve 9 with its associated parts is, according to standard practice, operatively connected to rotate with the horizontal table screw of the milling machine. When a dividing or indexing operation only is performed, the sleeve 9 is fixed to some stationary part of the frame or housing 2 such as the extension 10, the extension 10 in the present instance being connected by the screw 11 to the back disk 20, which has a hole 19 to receive the diminished portion 14 of the sleeve 9, and is secured or anchored to the shoulder portion 15 of the sleeve 9 by screws 18. The disk 20 has an 81 hole circle of index holes or divisions 12 and is connected to the common or dividing guide disk 28 by the plunger pin 29. The pin 29 is provided with a head 30 having a stem 31 which has a close sliding fit in each of the index holes or divisions 38 of the 82 hole circle of the common disk 28. The pin 29 has a stud 134 formed to engage one of the 81 recesses or holes 12 in the face of the back disk 20.

The common disk 28 is provided with a scale of 82 radial lines or divisions 16 on its tapered face 17, each line 16 passing through the center point of one of the holes 38 of the disk 28. Back disk 20 likewise has a scale of 81 radial lines or divisions 21 on its tapered face 22, each line passing through the center point of one of the holes 12 of the disk 20. When one of the lines 16 of the disk 28 registers with one of the lines 21 of the disk 20, the two index holes 12 and 38, which now also register, will receive the plunger pin 29. The scale lines are provided as a guide to lining up the holes. The disk 28 as clearly shown in Fig. 3, is rotatably mounted on the diminished portion 14 of the sleeve 9.

The front disk 24 bears a relation to the common disk 28, similar to the relation that the common disk bears to the back disk 20. The front disk 24 has a circle of 81 holes 23. These holes 23 each register, as the disk is turned, with any of the holes 25 of the 80 hole circle of the common disk 28. The stud or plunger pin 48 has a close fit in the holes 23 and 25 of both circles and serves to secure the front dividing disk 24, the common dividing disk 28 and the worm shaft 4 in their angular relationships to each other. The front disk 24 is provided with a scale of 81 radial lines 26 on its tapered face 27, each line passing through the center point of one of the holes 23 of the front disk 24. The scale which has 80 lines 34 (to correspond to the 80 holes 25 of the common disk) is engraved on the turnable adjustable angle ring 35, on which is also located the adjustable angle arm 52 and indicator screw 53. When the ring 35 is turned so that the arm 52 comes in contact with the plunger pin 48, the 80 lines 34 of the ring 35 will also be in line with the hole centers of the holes 25 of the common disk. Thus, as in the former described case for the holes 12 and 38, the lines of the scales 26 and 34 serve as an aid to bring a hole 23 of the circle of index holes 23 in register with a given hole 25 of the circle of holes 25, so that, together they might receive the plunger pin 48 and be secured in their angular relationship to each other.

Since in a dividing or indexing operation, the shaft 4 is to be successively turned relative to the disk 20, in the present arrangement the shaft 4 has fixed thereto the crank 46, and the front index disk 24. Also operatively connected, by virtue of sliding into any one of the index holes 23 of disk 24, there is the stud or pin 48 for cooperating with one of the circular row of 80 holes 25 of the common disk 28.

For securing the disk 28 in position on the diminished portion 14 of the sleeve 9 against the disk 20, there is provided a collar 49, secured to the diminished portion 14 of sleeve 9 with screws 39. Its shoulder 58 extending radially to the shaft 4, engages the countersunk shoulder 40 of the front disk 24, thus also holding it in position.

The adjustable angle arm 52 and the indicator screw 53 are rotatably mounted on ring 35, which turns in recess 41 in disk 28. They are set at an angle to span the required number of index holes by simply placing the indicator screw 53 in the required hole of the 80 tapped holes 50 of the ring 35. Likewise the fractional adjustable angle arms 56 and 57 are mounted on the ring 42, which turns in recess 43 of front disk 24 and is held in position by screws 44 against its shoulder 45. Ring 42 has a circle of 81 tapped holes 60. Adjustment for the fractional angle is made by securing the arm 57 to the required hole 60 with screw 59. The right angle bend 61 of the arms 56 and 57 serves to keep them in radial alignment. The adjustable angle arms 52, 53 and 56, 57 guide the placement of the pin 48.

The adjustable subfractional angle arms 63, 62 are secured to the adjustable angle ring 112 with the screws 64 in the circle of tapped holes 118. The ring 112 is turnably mounted on the common disk 28 which the shoulders 115 hold in place.

The pin housing 47, in the present instance, instead of being secured to an integral part of the crank arm 46, is mounted at the end of an arm 65, which is turnably mounted on the diminished portion 78 of the flange 79. It turns between the shoulders 80 of the handle 46 and 81 of the flange 79. The crank 46 is preferably secured in place on the front end of the shaft 4 by screw 89. Motion, transmitted from the crank handle 46 through the key 82 to shaft 4, is regulated and stopped through the keyed flange 79 and the disk 24, which are secured together by screws 83.

The pin housing 47, see Fig. 3, is provided with a spring 90 for normally urging the pin portion 48 outward, such spring 90 being positioned between the shoulder 91 of the pin 48 and the shoulder 92 of the housing 47. The pin 48 is provided with a shank 93 extending to and beyond the front end of the housing 47, there to receive the control head 94. The housing 47 is also provided with two raised stops, a half stop 95 and a full stop 96 to cooperate with the pin 97. The drawing, Fig. 3, shows the plunger pin 48 in contact with both the front disk 24 and the common disk 28 in which position the end 84 of the pin 97 does not rest on the front radially extending face of either of the stops 95 or 96.

The end 127 of plunger pin 48 just clears the common disk 28 when the end 84 of the stop pin 97 rests on the front radially extending face of the stop 95. This position permits access of the pin 48 to any of the 80 holes 25 of the common disk 28, guided by the adjustable angle arms 52, 53. The arm 52 is turned up on the hinge 85 to permit the pin 48 to pass it when the crank 46 is turned more than one turn per division. Stops 95 and 96 are shown in Figs. 2 and 3.

When the plunger pin 48 is fully withdrawn until the pin 97 rests on the front radially extending face of the stop 96, then the end 127 of plunger pin 48 just clears the front disk 24. In this position the arm 65 can be turned to permit entrance of the pin 48 into any one of the 81 fractional index holes 23 of the circle of the front disk 24, guided by the adjustable fractional angle arms 56 and 57.

The idea of using another circle of index holes to cooperate with the plunger pin and conventional circle of index holes is a twofold one.

The fractional and subfractional breakdown of the unit index hole is one of the main features of this invention. Primarily it is accomplished by simply introducing the 81 hole circle of the front disk 24 to cooperate with the plunger pin 48 and the conventional 80 hole index circle of holes 25 of the common disk 28. The equivalent of a very large conventional index circle of 6480 index holes has thus been created, as will appear from the equation, $$\frac{81 \times 80}{\text{Difference}-1} = 6480$$

In its secondary aspect this invention creates in the same way, another slightly larger simulated circle of 6642 index holes by breaking up into 82 parts each space of an eighty-one hole circle disk; that is, an 82 hole circle of holes 38 of the common disk 28 cooperating with a plunger pin 29 and an 81 hole back disc 20, as will appear from the equation, $$\frac{82 \times 81}{\text{Difference}-1} = 6640$$

Finally, a structure is provided whereby these two mammoth circles of index holes, 6480 and 6640, are matched to each other similar to the way the 81 hole circle hole disk 24 was matched to the 80 hole circle of holes 25 of the disk 28 in the first place. In other words, each hole or space of the simulated 6480 hole circle is subdivided into 41 parts, as will appear from the equation $$\frac{6642(82 \times 81) \times 6480(81 \times 80)}{\text{Difference}-162(6642-6480=162)} = 265,680$$

This combination thus constitutes the equivalent of a conventional index plate with a circle of 265,680 holes, if such could be had. In turn when multiplying $265,680 \times 40$ (gear reduction), the result will be 10,627,200 as the total number of divisions.

By using approximately twice the number of index holes in the circles of the three index disks, a maximum of 83,462,400 divisions becomes available.

It will now be shown how the magnitude of the angular movement produced by the described structural parts conforms to the theoretical conception of such motion, which has just been outlined.

Returning to the 81 hole fractional circle of the disk 24, it will appear how it cooperates with the plunger pin 48 and the 80 hole circle of holes 25 of the disk 28 to subdivide each of the 80 holes or sectors into 81 parts.

Fig. 2 shows the plunger pin 48 in full contact with a hole 23 of the front disk 24 and a hole 25 of the common disk 28. Each of these holes is "0" hole of each circle of holes 23, 25, respectively. Assume that the plunger pin 48 be entirely withdrawn and the control head 94 be turned until the end 84 of pin 97 rests on the front radial face of the stop 96. The arm 65 is now free to turn around the diminished portion 78 of flange 79 until the plunger pin 48 is in registration with the next hole—hole number "1" of the 81 hole circle of holes 23 of the front disk 24. It follows that the disk 24 and shaft 4 must be turned the equivalent of the difference of the angular measurement between the 81 holes 23 of disk 24 and the 80 holes 25 of disk 28, before the pin 48 can also enter the first hole 25 of the 80 hole circle of the common disk 28, resulting in the following relationship:

$$\frac{360°}{80} = 4° \ 30' \ 00''$$

$$\frac{360°}{81} = 4° \ 26' \ 40''$$

$3' 20''$ Difference—or the angular movement of disk 24

Suppose that the plunger pin 48 be placed in the number "2" holes of both circles in the manner just described for the number "1" holes. The angular movement of disk 24 and shaft 4 will then be $6' \ 40''$. Contact number "3" holes of both disks and so on, until holes numbered "80" are reached. On the next move, the plunger pin will be in the 81st or "0" hole of the 81 hole circle of front disk 24 from which it started and in hole numbered "1" of the 80 hole common disk circle, one hole advanced. It has taken 81 contacts of the plunger pin 48 in the 81 hole circle of the front disk 24 to advance one $4° \ 30'$ hole on the 80 space conventional circle of holes 25 of the common disk 28, as will appear from the following:

$$81 \times 3' \ 20'' = 4° \ 30'$$

Angular movement for each of the 81 fractional index holes after 40 to 1 gear reduction is:

$$\frac{3'20''}{40} = 5''$$

five seconds—exactly.

The number of divisions available, using only plunger pin 48 with the 81 hole circle of disk 24, the 80 hole circle of disk 28, and 40 to 1 gear reduction will equal:

$$81 \times 80 = 6480 \times 40 = 259,200$$

It has been shown how an 81 hole index disk 24 cooperating with an 80 hole index disk 28 is the condensed equivalent of a conventional 6480 hole index disk. Also how an 82 hole disk 28 cooperating with an 81 hole disk 20 does the work of a 6642 hole disk. It is, of course, not possible to use practically a conventional disk large enough to contain that many holes. It remains to describe how the chief feature of this invention, the common disk 28, makes it possible to match this 6642 space condensed or simulated disk to the 6480 space condensed disk, similar to the way the 81 hole disk 24 was matched to the 80 hole disk 28, to produce the equivalent of a conventional disk with 265,680 spaces, corresponding to the equation, $$\frac{6642(82 \times 81) \times 6480(81 \times 80)}{\text{Difference}-162} = 265,680$$

The common disk 28 is the common structural or mechanical member associated with the compounding together of 6642 and 6480.

In order to generate the new double compounded sector $$\frac{1}{265,680}$$

the smaller of the compounded sectors $$\frac{1}{6642}$$

is measured in reverse rotation, using the common disk 28 and the back disk 20, while the larger $$\frac{1}{6480}$$

sector is measured forward, using the common disk 28 and the front disk 24. It follows that the angular difference between these two movements is the net angular movement per hole forward, because the common disk 28 is common to both movements.

The $3' \ 20''$ angle is subdivided into 41 divisions of $4\tfrac{36}{41}''$ each, thus:

The motion forward, relative to the common disk 28, of the disk 24 and the shaft 4 per fractional index hole, $$\frac{1}{6480(81\times 80)}$$

has been shown to be 3' 20" or 5" after a 40 to 1 reduction. The smaller or reverse movement, measured by the arms 63, 62 and the pin 29 on the common disk 28 and the back disk 20 is 3' 15⁵⁄₄₁", or $$\frac{1}{6642(82\times 81)}$$

per fractional index hole. The common disk 28 with the front disk 24 and shaft 4 are turned back 3' 15⁵⁄₄₁" in this movement. The net motion forward is 4³⁶⁄₄₁" or ⁵⁄₄₁" after 40 to 1 reduction, that is $$\begin{array}{r} 3'20''\text{---forward, or} \\ \underline{3'15⁵⁄₄₁''\text{---back}} \\ 4³⁶⁄₄₁''\text{---net forward, or} \end{array}$$

$$\frac{4^{36}/_{41}}{40}=⁵⁄₄₁''\text{---after 40 to 1 reduction}$$

In other words, the smallest division—⁵⁄₄₁", is smaller than ⅛", after 40 to 1 gear reduction.

Also, since 360°=1,296,000", $$\frac{1,296,000''}{4^{36}/_{41}''}=265,680$$

showing that the common disk 28 resolves and transmits the correct magnitude of angular motion.

The rule which follows from this is: For every hole to be displaced by the pin 29 in a circle of holes 38 of a common disk circle 28, an extra hole shall be added to the number of 5" holes figured for displacement on the fractional circle 23 of front disk 24.

Summed up:

1 turn of disk 24 and shaft 4=9°
1 space, conventional, in the 80 hole circle=6' 45"
1 space, fractional, in the 81 hole disk 24=5"
1 space with the plunger pin 29 in the fraction circle of holes 38 of the common disk 28 combined with one space of the pin 48 in the fractional circle of holes 23 of the disk 24=⁵⁄₄₁".

For easy protractor or angle layout, a list can be made of the eighty 6' 45" spaces, which make up one crank 46 turn of nine degrees, 9°. Similarly, the subfractional spaces ⁵⁄₄₁" each should be listed so that the operator can instantly identify the angular value of any one of the 41 holes or spaces into which 5" is divided.

Each of the following dividing examples has been chosen because they especially illustrate in turn, the functions of the structural parts of the invention:

To divide the number "32":

$$\frac{80\times 40(3200)}{32}=100$$

holes or 1 turn of crank 46 plus 20 holes. Put indicator screw 53 in the 20th hole of the adjustable angle ring 35 and proceed as in conventional dividing:

1. Turn the adjustable angle ring 35 until the arm 52 contacts the pin 48,
2. Lift the pin 48 to clear the common index disk 28, but not the disk 24, using stop 95,
3. Turn the handle 46 one turn plus 20 holes until the pin 48 alines with indicator screw 53. The arm 52 is lifted up on hinge 85 to allow pin 48 to pass said arm, for numbers under 40 only.
4. Release the pin 48 from the stop 95, allowing the spring 90 to push it into hole numbered "20" of the common disk 28. For the next division, the arm 52 is turned again to engage the pin 48 and so on.

To divide the number "192":

$$\frac{80\times 40(3200)}{192}=16,-128=\text{remainder}$$

set the adjustable arms 52, 53 to 16 holes, $$\frac{81,\text{ fractional, }\times 128,\text{ remainder}}{192}=54$$

set the fractional adjustable arms 56, 57 to 54 holes,

1. Move the adjustable arm 52 and the fractional arm 56 to contact the pin 48,
2. Pull the pin 48 to the half stop 95 and turn the crank 46 until the pin 48 alines with the indicator 53,
3. Pull the pin 48 to the full stop 96 and turn it with the arm 65 until it registers with the hole indicated by the fractional arm 57,
4. Release the pin 48 to pass into the index hole of the front disk 24 and turn the crank 46 a fraction of a hole until the spring 90 pushes the pin 48 into the other index hole in the common disk 28, and then repeat: move the arms 52 and 56 to the contact pin 48 and so on.

To divide the number "191":

$$\frac{80\times 40(3200)}{191}=16.\ 144-\text{remainder};$$

set arms 52, 53 to 16 holes, $$\frac{81,\text{ fractional, }\times 144,\text{ remainder,}}{191}=64\text{ (tentative). }40-\text{remainder,}$$

$$\frac{41,\text{ subfractional, }\times 40,\text{ remainder,}}{191}=\frac{1640}{191}=9-,$$

$$191\overline{\smash{)}1640}\phantom{0}\atop\phantom{191)}\underline{1719}\phantom{0}\atop\phantom{191)}-79$$

set reverse adjustable angle arms 62, 63 to 9 holes, 79×(⁵⁄₄₁")=10"- the total accumulated error which can be ignored or "spread" if necessary. Remembering rule: for every ⁵⁄₄₁" hole to be displaced by the pin 29, an extra hole shall be added to the number of holes figured for the fractional circle of holes 23 of the front disk 24:

9-holes for pin 29, arms 62, 63,
64= (tentative) fractional holes for disk 24, and then
73—total set arms 56, 57 to 73 holes.

The 16 common disk index holes of disk 28 for arms 52, 53 and 73 fractional index holes for the arms 56, 57 of the front disk 24 are treated exactly as in the previous example for number 192.

In addition this time—for the compound:

1. Turn the arm 63 backward against the pin 29,
2. Withdraw the pin 29 to clear the disk 28 and move it back into the 9th hole in the common disk circle of holes 38, indicated by the arm 62,
3. Press lightly on the pin 29 and turn the common disk 28 a fractional hole backwards until the pin 29 enters the index hole in the back disk circle 12, and then repeat.

To lay off the angle 13° 35' 2.44",

| | | |
|---|---|---|
| 1½ turns of crank 46= | 13° 30' | 00" |
| 1 fractional hole in 81 hole front disk 24= | 5' | 00" |
| 20 holes, subfractional, of ⁵⁄₄₁" each= | | 2.439" |
| | 13° 35' | 2.439" | set the adjustable angle arms 62, 63 to 20 holes, set the adjustable angle arms 56, 57 to 1+20=21 holes, remembering the rule, and set the adjustable angle arms 52, 53 to 40 holes which is one-half the turn.

With the exception of the number of holes involved when the device was used as a divider, follow the instructions aforesaid for dividing the number "191".

As specific examples of operation, let it be assumed that it is desired to bore a circle of thirty-two one-half inch holes, equally spaced on a six inch radius, into a flat circular disk. It will then only be necessary to position and secure the turntable, Fig. 1, to the worktable of a vertical milling machine so that the axis center of its shaft 1 is exactly six inches distant from the center of the milling machine spindle. Thereupon place the flat circular disk in position on parallels on table 3, indicate its central and secure it with table clamps, then set brake 108, place the one-half inch diameter boring drill in the milling machine spindle chuck and lower the spindle to bore the first hole, release brake 108 and turn table 3 to the next position forward as directed above, that is, one turn of handle 46 plus 20 holes, reset brake 108 and repeat.

In turn, to cut 192 teeth on the periphery of a given gear blank, position and secure the turntable, Fig. 1, to the worktable of a horizontal milling machine so that the axis center of its shaft 1 is in line with the center of the gear cutter on the horizontal arbor of the milling machine, place the gear blank in a raised position on parallels on table 3, indicate it central with shaft 1 and secure it with bolts and table clamps, set brake 108, turn the milling machine horizontal table screw moving the table forward until the milling cutter touches the periphery of the gear blank. Then using the vertical screw, lower the milling table until the blank is slightly lower than the cutter, and again using the horizontal screw move the gear blank toward the cutter a distance equal to the whole depth of the gear tooth to be cut, and the machine is now ready to make the first cut. Thereupon, start the gear cutter turning and then throw in the vertical table feed. As the vertical table screw moves the gear blank upwards against the turning gear cutter, the first gash is made. Then lower the table, release the brake 108 and turn the table 3 to the next position forward as directed above, that is, sixteen holes measured by the arms 52, 53, and fifty-four holes measured by the arms 56, 57. Thereupon rest the brake 108 and repeat.

In turn, when it is desired to drill a circle of one hundred and ninety-one one-fourth inch holes, equally spaced on a five inch radius into a given flat circular disk, position and secure the turntable, Fig. 1, to the worktable of a drill press so that the axis center of the shaft 1 is exactly five inches distant from the center of the drill press spindle. Then place the flat circular disk in position on parallels on table 3, indicate it central and secure it with table clamps, set brake 108, place the one-fourth inch drill in the chuck of the drill press and lower the spindle to drill the first hole, then release brake 108 and turn table 3 to the next position forward as directed above, that is, sixteen holes measured by the arms 52, 53, seventy-three holes measured by the arms 56, 57, and nine holes measured by the arms 63, 62, reset the brake 108 and repeat.

In turn, to bore two one-half inch holes on a three inch radius so that they, together with the hole at the center of the disk will form an angle of 13° 35′ 2.44″ on a given flat circular disk. Position and secure the turntable, Fig. 1, to the worktable of a vertical milling machine so that the axis center of its shaft 1 is exactly three inches distant from the center of the milling machine spindle, place the flat circular disk in position on parallels on table 3, indicate the center hole central with the axis of shaft 1 and secure the disk with table clamps, set the brake 108, place the one-half inch diameter boring drill in the milling machine spindle chuck and lower the spindle to bore the first hole, release the brake 108 and turntable 3 to the next position forward as directed above, that is, one turn of the crank plus forty holes measured by the arms 52, 53, twenty-one holes measured by the arms 56, 57, and twenty holes measured by the arms 63, 62.

It is obvious that various changes and modifications may be made to the details of construction without departing from the general spirit of the invention set forth in the appended claims.

I claim:

1. In a dividing head for a machine shop tool, the combination of a control shaft operatively associated with the main shaft of the machine shop tool, a plurality of disks including a first disk mounted on said control shaft, each disk having circular rows of openings, the number of openings in any pair of rows being determined to supplement one another, a device locking said first disk against movement, a handle operatively mounted on said control shaft, means for selecting at least one of said remaining disks for operation with said handle, said selecting means including a pin holder operatively associated with said handle, a first pin operatively mounted in said holder to enter the openings in the disk selected, and means for positioning and securing the then remaining disk to said first disk, said means including a second pin to enter the openings in said then remaining disk and a sector counting device to span a predetermined number of the openings in said selected disk.

2. In a dividing head for a machine shop tool, the combination of a control shaft operatively associated with the main shaft of the machine shop tool, a plurality of disks including a first, second and third disk mounted on said control shaft, each disk having circular rows of openings, a first device locking said first disk against movement, a second device locking said second disk for movement by said control shaft, a handle operatively mounted on said control shaft, means for securing any opening of said second disk in coincidence with any selected opening of said third disk, means selecting said latter selected opening including a pin holder operatively associated with said handle, a pin operatively mounted in said holder to enter selected coinciding openings in the third disk, an adjustable sector counting device, and means for positioning and securing said third disk, said means including a pin to enter the coinciding openings in the first and third disks and an adjustable fractional sector counting device.

3. In a dividing head for a machine shop tool, the combination of a control shaft operatively associated with the main shaft of the machine shop tool, a plurality of disks mounted on said control shaft, each disk having circular rows of openings, the number of openings in each pair of rows being determined to supplement one another, a first device locking one of said disks against movement, a second device locking the other of said disks for movement by said control shaft, a handle operatively mounted on said control shaft, means for securing any selected opening of said other disk in coincidence with any selected opening of a mating disk, means selecting said selected openings including a pin holder operatively associated with said handle, a first pin operatively mounted in said holder to enter the selected openings in each disk, adjustable sector and fractional sector counting devices, means positioning and securing said mating disk after angular movement thereof, said latter means including a second pin to enter radially coincident openings in the disks, and an adjustable sector counting device.

4. In a dividing head for a machine shop tool, the combination of a control shaft operatively associated with the main shaft of the machine shop tool, a plurality of disks mounted around said control shaft, each disk having uniformly spaced sector division marks and radially coincident rows of openings, the number of radial marks and openings in the paired circles of radial marks and openings being determined to supplement one another, a first device locking one of said disks against movement, a second device locking the other of said disks to said control shaft, means for viewing in proximity for alinement said radial sector division marks, a handle operatively mounted on said control shaft, means for securing any selected radial sector division line of said other disk in alinement with any selected radial sector division line of said intermating disk, adjustable sector and fractional sector counting devices, and means positioning and securing said intermating disk, said means including a pin to enter the one of the chosen pairs of progressively coincident openings in the disks and an adjustable fractional sector counting device.

5. In a dividing head for a machine shop tool, the combination of a control shaft operatively associated with the main shaft of the machine shop tool, a plurality of disks mounted on said control shaft having paired circular rows of openings radially coincident but different in number, a first device locking one of said disks against movement, a second device locking the other of said disks for movement with said control shaft, a disk intermating with said disks, means selecting for operation with said handle and for circumferential coincidence with the openings of said first disk the radially coincident openings of said intermating disk, said selecting means including a pin and an adjustable fractional sector counting device, means for selecting other pairs of openings in radially coincident rows of said intermating disk and said other disk, said selecting means including a pin holder operatively associated with said handle and a pin slidably mounted in said holder and a spring for urging said pin upward into the openings selected for circumferential coincidence and indicated by adjustable sector and fractional sector counting devices.

6. In a dividing head for a machine shop tool, the combination of a control shaft operatively associated with the main shaft of the machine shop tool, at least a plurality of three annuli concentric to said control shaft and operatively connected thereto, each annulus having a circular row of divisions, the number of divisions or the angles included between the divisions in any adjacent pair of annuli differing from one another to facilitate supplementing one another, a device locking a first of said annuli against movement with said control shaft, means for selectively anchoring the remaining annuli to one another according to the angle to be subtended, stops on said remaining annuli to subtend a predetermined angle between them according to the angle to be subtended, and a sector counting device operatively connected to said control shaft and actuatable between said stops successively to actuate said shaft a distance corresponding to the angle predetermined between said stops.

7. In a dividing head for a machine shop tool, the combination of a control shaft operatively associated with the main shaft of the machine shop tool, at least a plurality of three annuli concentric to said control shaft and operatively connected thereto, each annulus having a circular row of openings, the number of openings or the angles included between the openings in each of said annuli differing from one another to facilitate supplementing one another, a device locking a first of said annuli against movement with said control shaft, means for selectively anchoring the remaining annuli to one another according to the angle to be subtended, stops on said remaining annuli to subtend a predetermined angle between them according to the angle to be subtended, and a sector counting device operatively connected to said control shaft and actuatable between said stops successively to actuate said shaft a distance corresponding to the angle predetermined between said stops.

8. In a dividing head for a machine shop tool, the combination of a control shaft operatively associated with the main shaft of the machine shop tool, at least two annuli operatively connected, and concentric, to said control shaft and vernierly connected to one another, each annulus having a circular row of divisions, the position of the divisions in the two annuli relative to one another supplementing one another to form different sizes of angles, a device locking one of said annuli against movement with said control shaft, stops on said other annulus to subtend a predetermined angle between them according to the angle to be subtended, and a sector counting device operatively connected to said control shaft and actuatable between said stops successively to actuate said shaft a distance corresponding to the angle predetermined between said stops.

References Cited in the file of this patent

UNITED STATES PATENTS

| Number | Name | Date |
|---|---|---|
| 893,954 | Van Huffel | July 21, 1908 |
| 2,324,476 | Becker | July 20, 1943 |
| 2,341,099 | Hellman | Feb. 8, 1944 |